United States Patent
Kwon et al.

(10) Patent No.: US 8,798,188 B2
(45) Date of Patent: Aug. 5, 2014

(54) METHOD AND APPARATUS FOR TRANSMITTING FEEDBACK INFORMATION ON A REFERENCE SIGNAL

(75) Inventors: Yeong Hyeon Kwon, Anyang-si (KR); Moon Il Lee, Anyang-si (KR); Han Kyu Cho, Anyang-si (KR); Jae Hoon Chung, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 13/319,331

(22) PCT Filed: May 10, 2010

(86) PCT No.: PCT/KR2010/002958
§ 371 (c)(1),
(2), (4) Date: Nov. 7, 2011

(87) PCT Pub. No.: WO2010/128836
PCT Pub. Date: Nov. 11, 2010

(65) Prior Publication Data
US 2012/0051451 A1 Mar. 1, 2012

Related U.S. Application Data

(60) Provisional application No. 61/176,493, filed on May 8, 2009.

(30) Foreign Application Priority Data

May 7, 2010 (KR) ........................ 10-2010-0043202

(51) Int. Cl.
*H04B 15/00* (2006.01)

(52) U.S. Cl.
USPC ............ 375/285; 375/296; 375/259; 375/295

(58) Field of Classification Search
USPC .................................. 375/285, 296, 259, 295
See application file for complete search history.

(56) References Cited

U.S. PATENT DOCUMENTS

| 7,688,910 B2 * | 3/2010 | Takano .......................... 375/267 |
| 2010/0034312 A1 * | 2/2010 | Muharemovic et al. ...... 375/267 |
| 2012/0033643 A1 * | 2/2012 | Noh et al. ..................... 370/335 |

FOREIGN PATENT DOCUMENTS

| WO | 2006/096886 | 9/2006 |
| WO | 2008/153350 | 12/2008 |

* cited by examiner

*Primary Examiner* — Michael Neff
(74) *Attorney, Agent, or Firm* — Lee, Hong, Degerman, Kang & Waimey

(57) ABSTRACT

The present invention relates to a method wherein a terminal transmits control information in a wireless communication system, and comprises the steps of: receiving a first reference signal, which is transmitted according to a first transmission period, from a base station; receiving a second reference signal, which is transmitted according to a second transmission period, from the base station; performing channel estimation using at least the first or second reference signals; and reporting control information, which includes at least channel information on the first reference signal or channel information on the second reference signal, to the base station according to the channel estimation result, wherein the control information may be configured such that the channel information on the first reference signal and the channel information on the second reference signal are multiplexed or such that any one of same is dropped.

10 Claims, 10 Drawing Sheets

METHOD AND APPARATUS FOR TRANSMITTING FEEDBACK INFORMATION ON A REFERENCE SIGNAL

CROSS-REFERENCE TO RELATED APPLICATIONS

This application is the National Stage filing under 35 U.S.C. 371 of International Application No. PCT/KR2010/002958, filed on May 10, 2010, which claims the benefit of earlier filing date and right of priority to Korean Application No. 10-2010-0043202, filed on May 7, 2010, and also claims the benefit of U.S. Provisional Application Ser. No. 61/176,493, filed on May 8, 2009, the contents of which are all hereby incorporated by reference herein in their entirety.

TECHNICAL FIELD

The present invention relates to a method and apparatus for transmitting feedback information on a reference signal in a wireless communication system, and more particularly, to a method and apparatus for reporting feedback information using a cell-common reference signal (CRS) and a channel state information-reference signal (CSI-RS).

BACKGROUND ART

Recently, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmission power, etc.). For examples of the multiple access system, there are CDMA (code division multiple access) system, FDMA (frequency division multiple access) system, TDMA (time division multiple access) system, OFDMA (orthogonal frequency division multiple access) system, SC-FDMA (single carrier-frequency division multiple access) system, MC-FDMA (multicarrier-frequency division multiple access) system and the like. In a wireless communication system, a user equipment may be able to receive information in downlink (DL) from a base station and may be also able to transmit information in uplink (UL) to the base station. The information transmitted or received by the user equipment may include data and various kinds of control informations. And, various physical channels may exist in accordance with types and usages of the information transmitted or received by the user equipment.

DISCLOSURE OF THE INVENTION

Technical Tasks

An object of the present invention is to provide a method of performing an effective channel information reporting in a wireless communication system.

Another object of the present invention is to provide a method of reporting channel information by means of reusing a report transport channel used by a legacy system or by means of using a new report transport channel.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting a channel information, which is transmitted by a user equipment in a wireless communication system, according to one embodiment of the present invention may include the steps of receiving a $1^{st}$ reference signal transmitted in accordance with a $1^{st}$ transmission period from a base station, receiving a $2^{nd}$ reference signal transmitted in accordance with a $2^{nd}$ transmission period from the base station, and performing channel estimation using at least one of the $1^{st}$ reference signal and the $2^{nd}$ reference signal, wherein if both of the channel information on the $1^{st}$ reference signal and the channel information on the $2^{nd}$ reference signal are transmitted at a same timing point in accordance with a result of performing the channel estimation, the channel information on the $1^{st}$ reference signal and the channel information on the $2^{nd}$ reference signal are multiplexed together or one of the channel information on the $1^{st}$ reference signal and the channel information on the $2^{nd}$ reference signal is dropped.

The $1^{st}$ reference signal may include a cell-common reference signal (CRS) and wherein the $2^{nd}$ reference signal includes a channel state information reference signal (CSI-RS).

When the channel information on the $1^{st}$ reference signal and the channel information on the $2^{nd}$ reference signal are transmitted at the same timing point on a same uplink channel, either the channel information on the $1^{st}$ reference signal or the channel information on the $2^{nd}$ reference signal may be dropped.

According to one embodiment of the present invention, when one of the channel information on the $1^{st}$ reference signal and the channel information on the $2^{nd}$ reference signal is dropped, a reference for dropping the channel information may include at least one selected from the group consisting of a channel information size, a reporting bit width, a number of bits allocated to a channel information reporting and a power level.

The channel information on the $1^{st}$ reference signal and the channel information on the $2^{nd}$ reference signal may be sequentially transmitted in accordance with a prescribed transmission priority reference and the prescribed transmission priority may include at least one selected from the group consisting of a channel information size, a reporting bit width, a number of bits allocated to a channel information reporting and a power level.

According to one embodiment of the present invention, if the channel information on the $1^{st}$ reference signal and the channel information on the $2^{nd}$ reference signal are multiplexed, a timing point of reporting the channel information on the $1^{st}$ reference signal may be adjusted into a prescribed offset range with reference to a timing point of reporting the channel information on the $2^{nd}$ reference signal.

In this case, the channel information transmitting method according to one embodiment of the present invention may further include the step of receiving an indication information on the channel information reporting timing point from the base station.

The channel information transmitting method according to one embodiment of the present invention may further include the step of receiving an indicating information for designating a reference signal becoming a target of the channel estimation from the base station and the indication information may designate at least one of the $1^{st}$ reference signal and the $2^{nd}$ reference signal as the target of the channel estimation.

In this case, the indication information may further include an indication information on a reporting scheme type of the control information and the reporting scheme type may include a scheme of multiplexing the channel information on the $1^{st}$ reference signal and the channel information on the $2^{nd}$ reference signal together or a scheme of dropping one of the channel information on the $1^{st}$ reference signal and the channel information on the $2^{nd}$ reference signal.

According to one embodiment of the present invention, the $2^{nd}$ transmission period may be configured longer than the $1^{st}$ transmission period.

To further achieve these and other advantages and in accordance with the purpose of the present invention, as embodied and broadly described, a user equipment in a wireless communication system according to another embodiment of the present invention may include a receiving module configured to receive a signal, a transmitting module configured to transmit a signal, and a processor configured to perform performing channel estimation using at least one of a $1^{st}$ reference signal and a $2^{nd}$ reference signal received via the receiving module from a base station. If both of the channel information on the $1^{st}$ reference signal and the channel information on the $2^{nd}$ reference signal are transmitted at a same timing point in accordance with a result of performing the channel estimation, the processor may multiplex the channel information on the $1^{st}$ reference signal and the channel information on the $2^{nd}$ reference signal together or may drop one of the channel information on the $1^{st}$ reference signal and the channel information on the $2^{nd}$ reference signal.

Advantageous Effects

According to embodiments of the present invention, a channel information reporting can be effectively performed in a wireless communication system supporting multi-carrier.

According to embodiments of the present invention, a method of reporting a channel information on CRS and a channel information on CSI-RS by means of reusing a previous transport channel or using a new transport channel.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts. Embodiments of the present invention may be usable for various wireless access systems including CDMA, FDMA, TDMA, OFDMA, SC-FDMA, MC-FDMA and the like. CDMA can be implemented with such a wireless technology as UTRA (universal terrestrial radio access), CDMA 2000 and the like. TDMA can be implemented with such a wireless technology as GSM/GPRS/EDGE (Global System for Mobile communications)/General Packet Radio Service/Enhanced Data Rates for GSM Evolution). OFDMA can be implemented with such a wireless technology as IEEE 802.11 (Wi-Fi), IEEE 802.16 (WiMAX), IEEE 802.20, E-UTRA (Evolved UTRA) and the like. UTRA is a part of UMTS (Universal Mobile Telecommunications System). 3GPP (3rd Generation Partnership Project) LTE (long term evolution) is a part of E-UMTS (Evolved UMTS) that uses E-UTRA. And, LTE-A (LTE-Advanced) is an evolved version of 3GPP LTE.

Embodiments in the following description may mainly concern a case that the technical features of the present invention are applied to 3GPP system, which is just exemplary and by which the present invention is non-limited.

Although the following description of the present invention may be explained on the basis of LTE-A, the concepts proposed by the present invention, the proposed methods and embodiments thereof may be applicable to other multi-carrier using systems (e.g., IEEE 802.16m system, etc.) without limitation.

Figure 1:
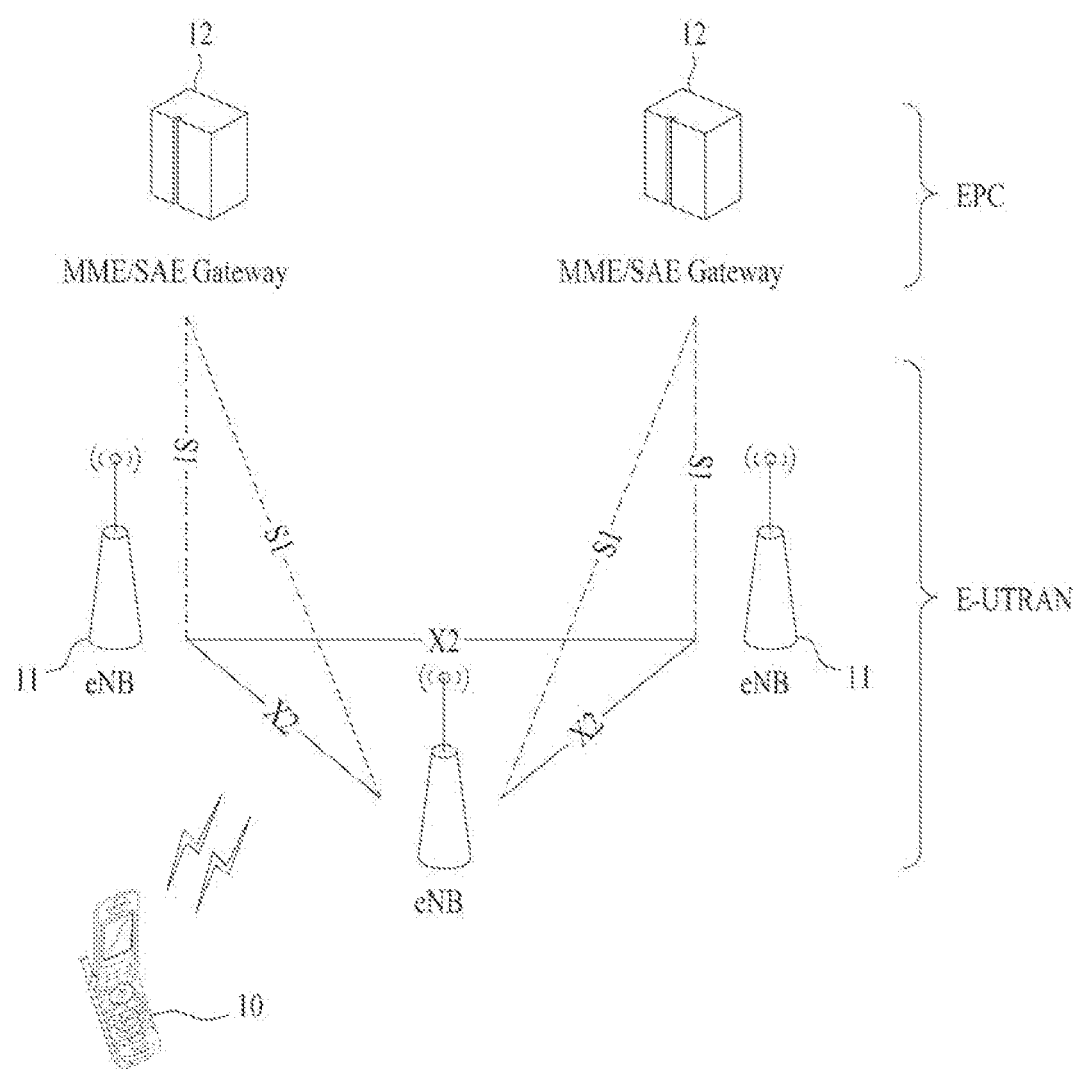
FIG. 1 is a diagram for a network structure of E-UMTS.

FIG. 1 is a diagram for a network structure of E-UMTS. E-UMTS may be called LTE system. A communication network is widely arranged to provide various kinds of communication services for audio, packets, data and the like.

Referring to FIG. 1, E-UMTS network may include E-UTRAN (evolved universal terrestrial radio access network), EPC (evolved packet core), and UE (user equipment). The E-UTRAN may include at least one base station (eNode B: eNB) 11. And, at least one user equipment 10 may be located in one cell. MME/SAE (mobility management entity/system architecture evolution) gateway 12 is situated at a network terminal and may be connectable to an external network. In this case, a downlink may indicate a communication 10 from the base station 11 to the user equipment 10 and an uplink may indicate a communication from the user equipment to the base station.

The user equipment 10 may include a communication device hand-held by a user, while the base station 11 may include a stationary station communicating with the user equipment in general 10. The base station 11 may provide the user equipment 10 with endpoints of a user plane and a control plane. One base station 11 may be deployed in each cell. An interface may be used between base stations 11 to transmit a user traffic or a control traffic. The MME/SAE gateway 12 may provide the user equipment 10 with an endpoint of session and mobility management function. The base station 11 and the MME/SAE gateway 12 may be connected to each other via S1 interface.

An MME may provide various functions including distribution of paging messages to the base stations 11, security control, idle state mobility control, SAE bearer control, encryption and integrity protection of non-access layer (NAS) signaling and the like. An SAE gateway host may provide various functions including termination of a planar packet, a user plane switching for mobility support of the user equipment and the like. The MME/SAE gateway 12 may be simply called a gateway in this specification and may include both an MME gateway and an SAE gateway.

A plurality of nodes may be connected to each other between the base station 11 and the gateway 12 via the S1 interface. The base stations 11 may be mutually connectable to each other via an X2 interface and neighbor base stations may be able to have a mesh network structure having the X2 interface.

Figure 2:
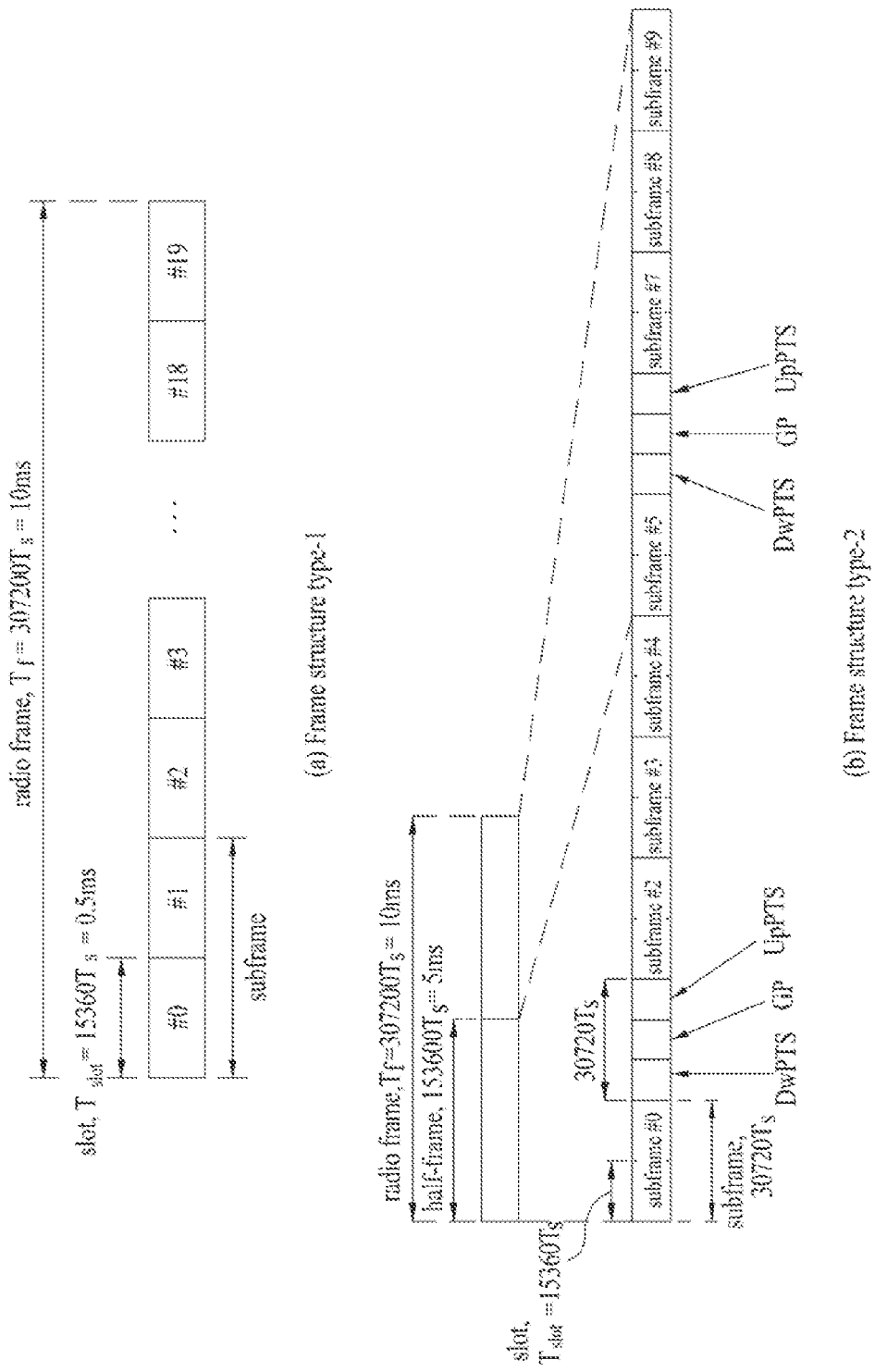
FIG. 2 is a diagram for an example of a structure of a radio frame used for LTE system.

FIG. 2 shows an example of a structure of a radio frame used for LTE system.

Referring to FIG. 2, a radio frame may have a length of 10 ms (327200·$T_s$) and may be constructed with 10 subframes in equal size. Each of the subframes may have a length of 1 ms and may be constructed with two slots. Each of the slots may have a length of 0.5 ms. In this case, $T_s$ may indicate a sampling time and may be expressed as $T_s=1/(15 \text{ kHz} \times 2048)$ =3.2552×10$^{-8}$ (about 33 ns). The slot may include a plurality of OFDM (orthogonal frequency division multiplexing) symbols or SC-FDMA symbols in a time domain and may include a plurality of resource blocks (RBs) in a frequency domain. In the LTE system, one resource block may include '12 subcarriers×7 or 6 OFDM (or SC-FDMA) symbols'. Frame structure type-1 and frame structure type-2 may be used for FDD and TDD, respectively. The frame structure type-2 may include 2 half-frames. And, each of the half-frames may include 5 subframes, a downlink piloting time slot (DwPTS), a guard period (GP) and an uplink piloting time slot (UpPTS). The above described structure of the radio frame may be just exemplary. And, the number/length of subframes, slots or OFDM (or SC-FDMA) symbols may be modifiable in various ways.

Figure 3:
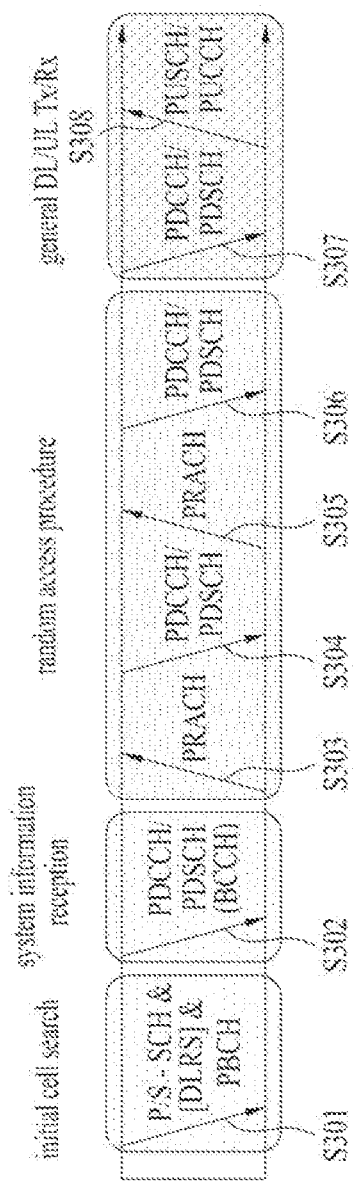
FIG. 3 is a diagram for explaining physical channels used for 3GPP system and a signal transmission using the same.

FIG. 3 is a diagram for explaining physical channels used for 3GPP system and a signal transmission using the same.

If a power of a user equipment is turned on or the user equipment enters a new cell, the user equipment may perform an initial cell search job for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment may receive a physical broadcast channel from the base station and may be then able to obtain intra-cell broadcast information. Having completed the initial cell search, the user equipment may receive a physical downlink control channel (PDCCH) and a physical downlink shared control channel (PDSCH) according to information carried on the physical downlink control channel (PDCCH) and may be then able to obtain system information in further detail [S302].

Meanwhile, if the user equipment initially accesses the base station or fails to have a radio resource for signal transmission, the user equipment may be able to perform a random access procedure (RACH) on the base station [S303 to S306]. For this, the user equipment may transmit a specific sequence as a preamble via a physical random access channel (PRACH) [S303, S305] and may be then able to receive a response message via PDCCH and a corresponding PDSCH in response to the preamble [S304, S306]. In case of contention based RACH, it may be able to perform a contention resolution procedure in addition.

Having performed the above mentioned procedures, the user equipment may be able to perform PDCCH/PDSCH reception [S307] and PUSCH/PUCCH (physical uplink shared channel/physical uplink control channel) transmission [S308] as a general uplink/downlink signal transmission procedure.

Meanwhile, control information transmitted/received in uplink/downlink to/from the base station by the user equipment may include DL/UL ACK/NACK signal, CQI (channel quality indicator), PMI (precoding matrix index), RI (rank indicator) and the like. In case of the 3GPP LTE system, the user equipment may be able to transmit the above-mentioned control information such as CQI, PMI, RI and the like via PUSCH and/or PUCCH.

Figure 4:
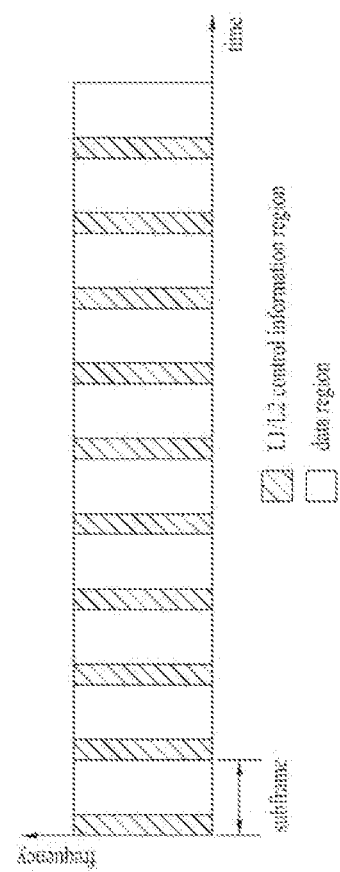
FIG. 4 is a diagram for a structure of a downlink subframe used for LTE system.

FIG. 4 is a diagram for a structure of a downlink subframe used for LTE system.

Referring to FIG. 4, a subframe may include L1/L2 (layer 1/layer 2) control information region and data region for transmitting DL data. The control region may start with a 1$^{st}$ OFDM symbol of a subframe and may include at least one OFDM symbol. A size of the control region may be set independent per subframe. Various control channels including PDCCH (physical downlink control channel) and the like may be mapped to the control region. The PDCCH may be a physical downlink control channel and may be assigned to first n OFDM symbols of a subframe. The PDCCH may include at least one control channel element (CCE). The CCE may include 9 neighbor resource element groups (REGs). The REG may include 4 neighbor REs except a reference signal. In this case, the RE may be a minimum resource unit defined as '1 subcarrier*1 OFDM symbol'.

Figure 5:
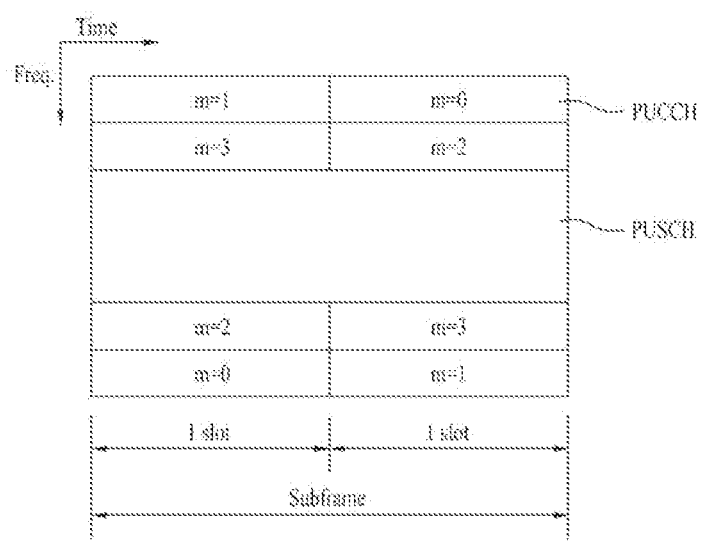
FIG. 5 is a diagram for a structure of an uplink subframe used for LTE system.

FIG. 5 is a diagram for a structure of an uplink subframe used for LTE system.

Referring to FIG. 5, a UL subframe may include a plurality of slots (e.g., 2 slots). The slot may include a different number of SC-FDMA symbols in accordance with a length of a cyclic prefix (CP). For instance, in case of a normal CP, a slit may include 7 SC-FDMA symbols. The UL subframe may be divided into a data region and a control region. The data region may include a UL shared channel (PUSCH) and may be used to transmit data signals of audio, video and the like. The control region may include a UL control channel (PUCCH) and may be used to transmit control information. The PUCCH may include an RB pair situated at both ends of the data region on a frequency axis and may hop on the boundary of a slot. The control information may include HARQ (hybrid automatic retransmit request) ACK/NACK and channel information on DL (hereinafter named DL channel information or channel information). The DL channel information may include CQI. PMI. RI and the like. A base station may determine a time/frequency resource, a modulation scheme, a coding rate and the like suitable for a data transmission to each user equipment using the channel information received from the corresponding user equipment.

In LTE system, channel information may include CQI, PMI, RI and the like. In accordance with a transmission mode of each user equipment, the CQI, PMI and RI may be transmitted entirely or in part. If channel information is periodically transmitted, it may be named a periodic reporting. If channel information is transmitted by a request made by a base station, it may be named an aperiodic reporting. In case of the aperiodic reporting, a request bit included in UL scheduling information downloaded from a base station is transmitted to a user equipment. Subsequently, the user equipment delivers channel information to the base station on UL data channel (PUSCH) in consideration of its transmission mode. In case of the periodic reporting, a period, an offset in the corresponding period and the like are signaled by a subframe unit semi-statically via an upper layer signal per user equipment. Each user equipment delivers channel information to a base station in accordance with a determined period in consideration of a transmission mode. If UL data simultaneously exists in a subframe that carries channel information, the channel information may be transmitted on UL data channel (PUSCH) together with data. In consideration of a channel status, a user equipment distribution in a cell and the like, a base station transmits transmission timing information suitable to each user equipment. In this case, the transmission timing information may include a period, offset and the like to transmit channel information and may be transmittable to each user equipment via a radio resource control (RRC) message.

Figure 6:
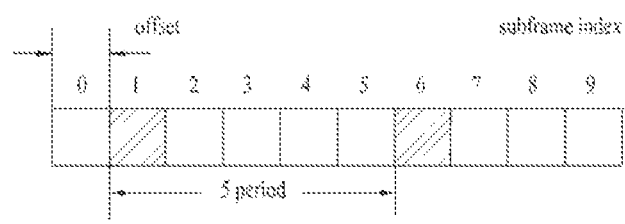
FIG. 6 is a diagram for one example of transmitting channel information in case that a user equipment receives random information by signaling.

FIG. 6 is a diagram for one example of transmitting channel information in case that a user equipment receives random information by signaling.

In LTE system, 4 kinds of CQI report modes exist. In particular, the CQI report mode may be classified into a wideband (WB) CQI and a subband (SB) CQI in accordance with a CQI feedback type or may be classified into No PMI and Single PMI in accordance with a presence or non-presence of OMI transmission. Each user equipment may receive information including a combination of period and offset through RRC signaling to report CQI periodically.

Referring to FIG. 6, in case of receiving information indicating that period and offset are set to 5 and 1, respectively, a user equipment transmits channel information by a unit of 5 subframes by leaving an offset of a subframe in an increasing direction of a subframe index from $0^{th}$ subframe. Although channel information is basically carried on PUCCH, if PUSCH for data transmission exists at the same timing point, the channel information may be transmitted on PUSCH together with data. A subframe index may include a combination of a system frame number (nf) and a slot index (ns: 0~19). As a subframe includes 2 slots, a subframe index may be defined as '10*nf+floor(ns/2)'. In this case, 'floor( )' may indicate a round-down function.

There are a type of transmitting WB CQI only and a type of transmitting both WB CQI and SB CQI. The type of transmitting WB CQI only may transmit CQI information on a whole band in a subframe corresponding to each CQI transmission period. Meanwhile, if PMI needs to be transmitted in accordance with a PMI feedback type, as shown in FIG. 6, PMI information may be transmitted together with CQI information. In case of the type of transmitting both WB CQI and SB CQI, WB CQI and SB CQI may be alternately transmitted.

Such DL channel information as CQI, RI, PMI and the like may be estimated using a reference signal.

A reference signal transmitted in DL subframe in LTE may be described with reference to FIG. 7 as follows.

Figure 7:
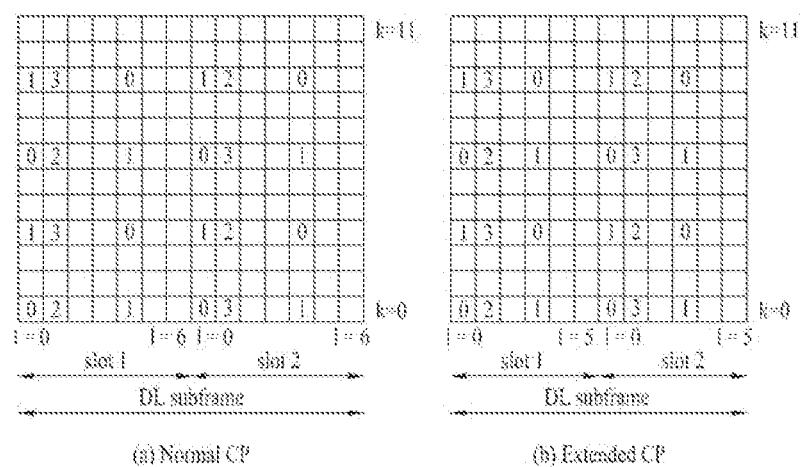
FIG. 7 is a diagram for patterns of a reference signal used for LTE system.

FIG. 7 is a diagram for patterns of a reference signal used for LTE system. In FIG. 7, 'l' may indicate an OFDM symbol index and 'k' may indicate a subcarrier index.

In LTE system, reference signals may include a cell-specific RS (CRS), a multicast broadcast single frequency network (MBSFN) RS, a UE-specific RS and the like.

The CRS may be transmitted in all DL subframes and may be used for demodulation of channel state information and transport channel. In case of MBSFN subframe, CRS may be carried on $1^{st}$ and $2^{nd}$ OFDM symbols only. As 4Tx antenna having antenna ports 0 to 3 are supported in DL for CRS transmission, CRS for the antenna ports 0 to 3 may be multiplexed in resource block by FDM/TDM and may be mapped to resource elements (REs) indicated by 0 to 3 in the corresponding drawing.

Since CRS is used for the demodulation of channel state information and transport channel in LTE system, the CRS may be transmitted in all DL subframe or on an entire system band. Yet, in viewpoint of the channel state information, it may be unnecessary for a reference signal to be transmitted in each subframe. In viewpoint of channel demodulation, a reference signal may be only transmitted in a resource region to which a transport channel is mapped. And, the CRS may be transmitted by being mapped to a normal CP or an extended CP, as shown in FIG. 7.

There is an ongoing discussion to define reference signals in a manner of discriminating a reference signal for channel state information and a reference signal for channel estimation from each other. In particular, the former may be represented as a channel state information reference signal (CSI-RS) and the latter may be represented as a demodulation reference signal (DM-RS). Theses terminologies may be provided to describe the present invention and may be substituted with equivalent terminologies as well.

In LTE, a base station may be able to randomly configure antennas for CRS operation and CSI-RS operation. For instance, when a base station uses maximum 8Tx antennas, the antennas are combined to operate as 4Tx for the CRS operation. And, it may be able to operate as 8Tx for the CSI-RS operation in a manner of transmitting a signal via each of the antennas. In this case, since a user equipment may be unable to know the antenna operating scheme of the base station through a transmitted reference signal, it may cause a problem of having difficulty in performing channel estimation by mixing the CRS and the CSI-RS together. Moreover, in case that feedback information on CRS and feedback information on CRI-RS are transmitted on the same control channel, the number of channels may be insufficient in consideration of a size of the feedback informations.

Due to the above problems, a user equipment in LTE-A system may use a method of reporting one RS, e.g., feedback information on CRI-RS, rather than transmitting feedback information on all RS. In this case, unlike CRS transmitted in each frame, since CRS-RS is transmitted by a period of several subframes, a channel state measuring period is increased, which may lower channel measurement accuracy. Yet, if a transmission period of CSI-RS is operated by being set short to solve the above problems, overhead due to CSI-RS may increase.

Therefore, the present invention may intend to propose a method for a user equipment to transmit all channel information to a bas station via a conventional reference signal and a reference signal newly defined for channel state measurement.

In the following description of this specification, a common reference signal (CRS) is taken as an example of a conventional reference signal and a channel state information reference signal (CSI-RS) is taken as an example of a newly defined reference signal.

In the following description of this specification, in order to identify a user equipment operable in both LTE system and LTE-A system, such a conventional system as LTE system may be named a legacy system and a user equipment operable in the legacy system may be named a legacy user equipment.

1. Channel Information Transmitting Scheme Using CRS/CSI-RS

According to one embodiment of the present invention, if a user equipment transmits all channel information measured using CRS/CSI-RS to a base station, it may be able to derive necessary channel information by processing feedback information transmitted by the base station.

Figure 8:
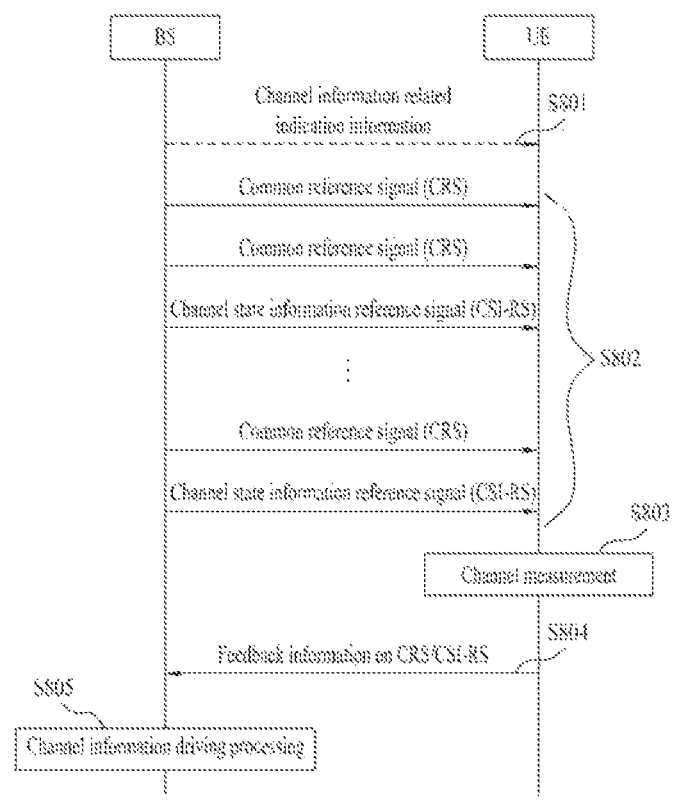
FIG. 8 is a diagram for one example of a process for a user equipment to report a channel information to a base station using a reference signal according to one embodiment of the present invention.

FIG. 8 is a diagram for one example of a process for a user equipment to report a channel information to a base station using a reference signal according to one embodiment of the present invention.

Referring to FIG. 8, a base station may be able to broadcast indication information including at least one of a target RS indicating a specific RS, which is to be used for channel estimation by a user equipment among various RSs, and information on a channel information reporting scheme to be used by the user equipment to user equipments located within a cell or may be able to signal the indication information per user equipment [S801].

The RS transmittable by the base station may include CRS, CSI-RS, DM-RS and the like mentioned in the foregoing description. And, the indication information may indicate at least one of the RSs. For instance, the indication information may be able to make a request for performing channel estimation on CRS and CSI-RS.

The information on the channel information reporting scheme, which is included in the indication information, may be able to designate a separate repotting scheme of transmitting both channel informations on different UL channels, respectively, or a joint reporting scheme of transmitting both channel informations on one UL channel by combining both channel informations together. Each transmission scheme may be schematically explained later.

Thereafter, the base station transmits RS on a DL channel. For instance, CRS may be mapped to each subframe and may be then transmitted. And, CSI-RS may be transmitted by a prescribed period (e.g., 5~10 msec) [S802].

The user equipment may derive channel information by measuring the DL channel carrying the corresponding RS using each of the received CRS and the received CSI-RS [S803].

Subsequently, the user equipment may feed back the channel information generated from measuring the CRS and the CSI-RS to the base station on a UL channel (e.g., PUCCH and/or PUSCH) [S804].

Having received the channel information generated from measuring the CRS and the CSI-RS, the base station may be able to derive information on an actually used channel from the channel information according to the CRS and the CSI-RS based on antenna operating information in case of each reference signal transmission [S805].

In LTE/LTE-A, a base station may be able to randomly configure antennas in case of CRS operation and CSI-RS operation. For instance, in case that a base station uses maximum 8Tx antennas, the antennas may be combined to operate as 4Tx in case of the CRS operation or may operate as 8Tx in a manner of transmitting a signal for each antenna in case of the CSI-RS operation. Since a user equipment performs estimation on a channel used for RS transmission only irrespective of such antenna operating information, a base station may preferably derive necessary channel information by processing channel informations on the respective RSs.

Generally, since a base station obtains information on such an antenna configuration as precoding per antenna, virtual antenna, antenna property and the like, even if a user equipment transmits channel information on CRS and channel information on CSI-RS separately, the base station may be able to perform a processing for deriving channel information on each antenna by combining the channel informations together.

Thus, in case that a user equipment reports both channel information on CRS and channel information on CSI-RS, it may be able to use a separate reporting scheme of separating the channel information on the CRS and the channel information on the CSI-RS from each other or a joint reporting scheme of jointing the channel information on the CRS and the channel information on the CSI-RS together. In the following description, channel information reporting schemes according to embodiments of the present invention shall be schematically explained.

$1^{st}$ Embodiment

Separate Reporting Scheme

According to one embodiment of the present invention, a user equipment may be able to perform feedback transmission using a separate reporting scheme of separately transmitting channel information on CRS and channel information on CSI-RS to a base station. In particular, feedback information on CRS and feedback information on CSI-RS are transmitted on different channels, respectively.

For instance, a user equipment measures and reports CRS by a legacy scheme and may be able to use a newly defined reporting scheme for CSI-RS. Information transmitted via channel measurement may include power on specific resource granularity, phase, signal transmission direction (spatial information), statistical information, subset for transmission format or feedback codebook index. A feedback information transmission format according to a legacy scheme may use such a legacy feedback format as PUCCH Format 2 Series or may be configured identical to the legacy feedback format. Meanwhile, if a new transmission format is defined in LTE-A, it may be usable for a feedback transmission for CSI-RS. For a new transmission format, at least one new RB may be used and a whole symbol space, which may include frequency/time/code resource and/or modulation scheme for example, may be extended to include an information size increased according to a channel estimation measurement result for CSI-RS.

A user equipment may generate channel informations separately by discriminating CRS and CSI-RS from each other independently and may be then able to transmit the generated channel information to a base station in accordance with each prescribed period. In doing so, although a channel information reporting period for the CRS and a channel information reporting period for the CSI-RS are different from each other, the channel informations may be temporarily transmitted at the same timing point.

Therefore, according to an embodiment of the present invention, proposed is a solution for a case that a channel information transmission for CRS overlaps with a channel information transmission for CSI-RS.

Option 1: Meeting Single Carrier Property for CRS/CSI-RS Feedback Information

According to one embodiment of the present invention, when a user equipment transmits CRS channel information and CSI-RS channel information on different channels, respectively, in order to prevent both channels transmitted at the same timing point from overlapping with each other, it may be able to adjust channel information transmission timing points for CRS and CSI-RS not to overlap with each other.

First of all, it may be able to adjust period and/or offset for transmitting channel information. In particular, a channel information transmission period of one of two channel informations may be adjusted into a multiple of a transmission period of the other channel information. Alternatively, an offset value of a reporting period of channel information on CRS may be determined with reference to a channel information reporting period for CSI-RS. In particular, since a base station, which receives feedback information, is able to derive information on each channel based on channel information via CRS and channel information via CSI-RS, a user equipment may be able to determine a reporting period for CRS with reference to CSI-RS intermittently transmitted.

The transmission period and/or offset adjustment for the channel information reporting may be randomly determined by a user equipment. Alternatively, the transmission period and/or offset adjustment for the channel information reporting may be determined by a base station and may be then transmitted through the indication information in the signaling step S801 or by separate signaling.

Secondly, it may be able to actively configure one feedback channel in a manner that one of two channel informations is excluded and that the rest is transmitted only. In particular, in order to meet the signal carrier property for the CRS channel information transmission and the CSI-RS channel information transmission, one of two channel informations may be dropped. For this, it may be able to designate priority for the 2 channel information transmissions.

In a method of determining a priority for a channel information reporting according to one embodiment of the present invention, the priority may be determined in a manner of comparing channel information sizes (e.g., CQI, RI, PMI, etc.), reporting bit width determinations, bit number allocations, power levels and/or the like for the CRS channel information and the CSI-RS channel information.

For instance, by comparing a channel information size for CRS and a channel information size for CSI-RS to each other, it may be able to determine which channel information will be preferentially transmitted with reference to whether more information may be reliably obtainable at the greater number of antennas. Alternatively, in accordance with a low frequency of transmissions of CSI-RS, it may be able to set a priority for a channel information on CRS. In this case, a low rank operation may further meet the reliability on channel measurement.

Thirdly, for example of another method for preventing overlapping in transmitting channel information on CRS and channel information on CSI-RS, it may be able to allow piggybacking for PUSCH in which the channel information on the CRS and the channel information on the CSI-RS may be operable on the same PUSCH transmission resource. This PUSCH piggybacking may be specified on the basis of indication information (e.g., PDCCH field indicator for a piggybacking available format, upper layer signaling and PDCCH triggering of feedback format, etc.) transmitted from a base station. This indication information may be signaled in the step S801 shown in FIG. 8 as well.

Option 1: No Need to Meet Single Carrier Property for CRS/CSI-RS Feedback Information According to another embodiment of the present invention, for example of prevention of overlapping in 2 channel information transmissions, while CRS channel information and CSI-RS channel information are transmitted on different feedback transport channels, respectively, it may be able to adjust them no to have single carrier property.

For instance, a user equipment according to one embodiment of the present invention may be able to configure channel information on CRS and channel information on CSI-RS to be transmitted in a manner of overlapping a reporting transmission period for the CRS and a reporting transmission period for the CSI-RS with each other to merge the channel information on the CRS and the channel information on the CSI-RS into one feedback channel.

$2^{nd}$ Embodiment

Joint Reporting Scheme

Referring to FIG. 8, in the CRS/CSI-RS channel information transmitting step S804, a user equipment may be able to transmit channel information on CRS and channel information on CSI-RS to a base station by jointing them together. In particular, feedback information on the CRS and feedback information on the CSI-RS are merged together and are then transmitted on a newly configured UL channel.

A user equipment may be able to transmit channel information on CRS and channel information on CSI-RS to a base station randomly or in accordance with signaling of the base station using the joint reporting scheme of jointing them together. In doing so, although the channel information on the CRS and the channel information on the CSI-RS are transmitted by the same transmission scheme using a newly configured control information channel, the informations may be transmitted in a manner of discriminating them from each other in time domain using TDM (time division multiplexing) scheme. Alternatively, the two channel informations may be encoded in a manner of being jointed into a single reporting format.

First of all, in case of reporting channel information on CRS and channel information on CSI-RS on the same channel by jointing them together, a channel measurement on the CRS may be performed in a manner of separating channel measurement on the CSI-RS and a reporting timing point for the two channel informations from each other in time domain (e.g., separation by slot unit, separation by symbol unit, etc.). For instance, the channel information on the CSI-RS may be set to be transmitted at a specific position in the time domain and the channel information on the CRS may be determined to be transmitted at another position in the time domain with reference to a CSI-RS channel information reporting timing point.

TDM configuration of multiplexing a timing point of reporting channel information on CRS and a timing point of channel information on CSI-RS by a joint reporting scheme according to one embodiment of the present invention may be set on an interface in advance or may be configured by a base station. And, the TDM configuration may be indicated to a user equipment through upper layer signaling or DL L1/L2 signaling. In particular, the TDM configuration may be performed in the indication information signaling step S801 of the base station shown in FIG. 8 or may be performed in a separate signaling step.

In the joint reporting scheme, the determination of the reporting timing points or periods of the two channel informations may be related to a period of CSI-RS transmission and a transmission frequency number thereof. If CSI-RS measurement is not performed or it is unable to measure CSI-RS, CRS channel information may not be useful. Hence, a transmission timing point of the jointed channel information may be determined with reference to the CSI-RS.

If a channel measurement for the CSI-RS is possible at a specific position in a time domain, the same measurement result for the CSI-RS may not be fed back without update information. Hence, a user equipment may be able to determine a reporting time for channel information with reference to an available time for CSI-RS measurement. For instance, a channel information reporting time may be determined as a time behind $K^{th}$ subframe (K>0) with reference to a CSI-RS transmitted timing point in a frame. This may mean that a feedback time according to CRS measurement and a feedback time according to CSI-RS measurement may be arranged in the same TTI (transmit time interval).

In particular, in the joint reporting scheme, the channel information reporting time may be determined with reference to CSI-RS transmission time zone only and the CSI-RS measurement may become an average information or an instant measurement information in CSI-RS subframe.

This determination on the reporting timing point or period of the jointed channel information may be made by a user equipment or a base station. In case that this determination is made by the base station, it may be separately signaled to each user equipment or may be signaled in the indication information transmitting step S801.

Secondly, in the joint reporting scheme according to one embodiment of the present invention, both of CRS channel information and CSI-RS channel information are reported in a manner of designating a priority. Which channel information will be preferentially transmitted may be randomly determined by a user equipment or may follow the indication information transmitted by a base station.

For example of a method for a user equipment to determine a priority on CSI-RS measurement feedback according to one embodiment of the present invention, the priority may be determined with reference to a channel information size. In particular, by comparing a channel information size for CRS and a channel information size for CSI-RS to each other, it may be able to determine which channel information will be preferentially transmitted with reference to whether more information may be reliably obtainable at the greater number of antennas. For instance, in accordance with a low frequency of transmissions of CSI-RS, it may be able to set a priority for a channel information on CRS. In this case, a low rank operation may have more reliability on channel measurement.

For another instance, if a CRS channel information reporting time and a CSI-RS channel information reporting time overlap with each other, a user equipment may be able to determine the priority for the channel information reporting in a manner of comparing channel information sizes (e.g., CQI, RI, PMI, etc.) in a reporting process, reporting bit width determinations, bit number allocations, power levels and/or the like.

Thirdly, if the CRS measurement and the CSI-RS measurement are encoded in a manner of being jointed into one transmission format, the channel information via CRS and the channel information via CSI-RS may carry information according to CSI-RS measurement requested in a single transmission format. If so, it may be preferable that the CSI-RS may be singly transmitted each time the CSI-RS should be transmitted.

If a channel information size resulting from jointing the CRS channel information and the CSI-RS channel information together by the joint reporting scheme is difficult to be singly transmitted in a conventional PUCCH format, the channel information on the CSI-RS may be multiplexed to be transmitted through a plurality of frames in a manner of being divided into a plurality of informations. In doing so, information on the divided channel information number may be separately signaled to each user equipment by a base station or may be signaled in the step S801.

Having received the divided channel information from the user equipment, the base station may be able to derive the whole information of the CSI-RS by collecting the channel information carried on a plurality of the frames in the step S805 of performing the processing on the channel information.

Thus, according to another embodiment of the present invention, a CRS channel information size and a CSI-RS channel information size may be configured in various sizes in accordance with channel information reporting times, respectively or may be configured in a manner of being fixed to the same size for each channel information reporting transmission.

2. Changing CRS/CSI-RS Channel Information Transmission Scheme

According to a further embodiment of the present invention, a base station may be able to randomly change a channel information transmission scheme in the course of performing a communication. In doing so, the base station may be able to transmit an information on a target RS to be used for a channel estimation and an indication information indicating a channel information reporting scheme to a user equipment.

Figure 9:
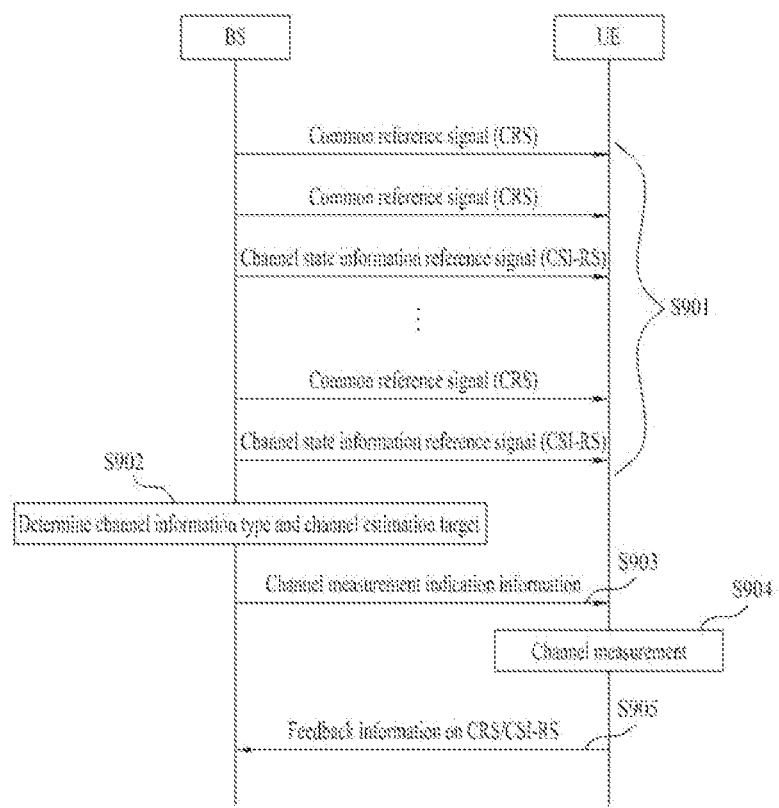
FIG. 9 is a diagram for another example of a process for a user equipment to report a channel information to a base station using a reference signal according to one embodiment of the present invention.

FIG. 9 is a diagram for another example of a process for a user equipment to report a channel information to a base station using a reference signal according to one embodiment of the present invention. Although a signaling step corresponding to the former step s801 for a base station to transmit an indication information in an early stage, which is described with reference to FIG. 8, is not shown in FIG. 9, assume that the corresponding signaling step is performed.

Referring to FIG. 9, a base station may transmit RS in DL channel to each user equipment. For instance, the base station transmits CRS by mapping the CRS to each subframe and may be able to transmit CSI-RS in accordance with a prescribed period [S901].

In doing so, in case of attempting to change a channel estimation target RS type and/or a channel information reporting scheme, the base station may select a corresponding channel estimation target RS type and/or a corresponding channel information reporting scheme [S902] and may be then able to signal a corresponding change indication information to the user equipment [S903].

For instance, it may indicate to perform a channel measurement by setting a target to one of RSs including CRS, CSI-RS and the like through an indication information and may indicate whether to transmit feedback information on the channel measurement. The indication information may indicate to report either CRS channel information or CSI-RS channel information or may indicate to repot both of the CRS channel information and the CSI-RS channel information according to the above mentioned embodiments.

If it is designated to report both of the CRS channel information and the CSI-RS channel information, it may be able to designate the separate reporting scheme or the joint reporting scheme an the PUSCH reporting type according to the aforesaid embodiments as a reporting type.

Moreover, the indication information may include a transmission period and offset information as a specific transmission time information for specifying a feedback transmission time of channel information. In this case, the transmission time information may be represented as a transmission period changed with reference to a transmission period originally transmitted by a user equipment or an offset information on an offset changed with reference to offset information originally transmitted by a user equipment.

When a channel information type and a channel measurement target are selected in a scheduling operation determining process, a base station may enable an efficient channel information reporting scheme to be operated in a manner of determining to reuse a CRS overhead and a CSI-RS overhead.

The channel measurement indication information may be transmitted through an upper layer signaling or an L1/L2 signaling (e.g., PUCCH, MAC messaging, etc.).

Subsequently, the user equipment may measure a channel in accordance with the channel measurement indication information received in the previous step using the transmitted CRS or CSI-RS and may then derive channel information [S904]. The user equipment may transmit the channel information to the base station on PUCCH and/or PUSCH [S905]. In accordance with a channel information transmission indication information included in the indication information of the base station, the user equipment may be able to transmit the channel information to the base station in a specific time or by a specific period.

In doing so, the transmitted channel measurement information according to one embodiment of the present invention may not be identical to a feedback information of a legacy system. In particular, the channel measurement information may include at least one power, phase, spatial information, average information and the like for a channel response.

In the DCI format of the aforesaid embodiment, a prescribed CQI reporting trigger is used in case of an operation in a legacy system. In order to extend this operation, the DCI format may be differently interpreted or extended to apply a different channel information reporting scheme.

The user equipment may be able to generate a same signal bit indicator indicating the aforesaid indication information. Thereafter, CRS channel information and CSI-RS information may be separately reported or may be reported by being jointed together, in accordance with a previously defined method (e.g., a method previously set according to a prescribed setting option, a method configured by an upper layer of a base station, etc.).

A user equipment mentioned in this specification may include an LTE-A user equipment, a user equipment of a version after LTE-A or such a medium device as a relay. In this case, it may occur that visibility of CSI-RS is not secured. For instance, when CSI-RS is configured to be transmitted each 5 ms, if a period taken for a relay to access a network is 8 ms, it may cause a problem that the relay is unable to measure all CSI-RS transmitted. If all CSI-RS are not measured like the relay, channel information on CSI-RS at the timing point of not measuring the CSI-RS may be configured not to be transmitted or a scheme of transmitting a result of measuring CRS may be selected.

In particular, as mentioned in the foregoing description, in case that channel information on CRS and channel information on CSI-RS are configured to be independently transmitted by a separate reporting scheme, a user equipment may not transmit any channel information unless observing CSI-RS. Alternatively, if CRS channel information or CSI-RS channel information is selectively transmitted, a relay may be able to transmit a result of measuring CRS to a base station instead of CSI-RS.

If so, since the base station may be able to automatically know a type of the transmitted channel measurement information, the base station may be able to perform an optimal scheduling related to RS transmission or channel selection for the corresponding relay. This scheme may be more suitable for a mobile relay having a varying channel or a fixed relay having frequently varying surroundings than for a fixed relay.

A base station and a user equipment, which belong to DAS for implementing embodiments of the present invention, may be described with reference to FIG. 10 as follows.

Figure 10:
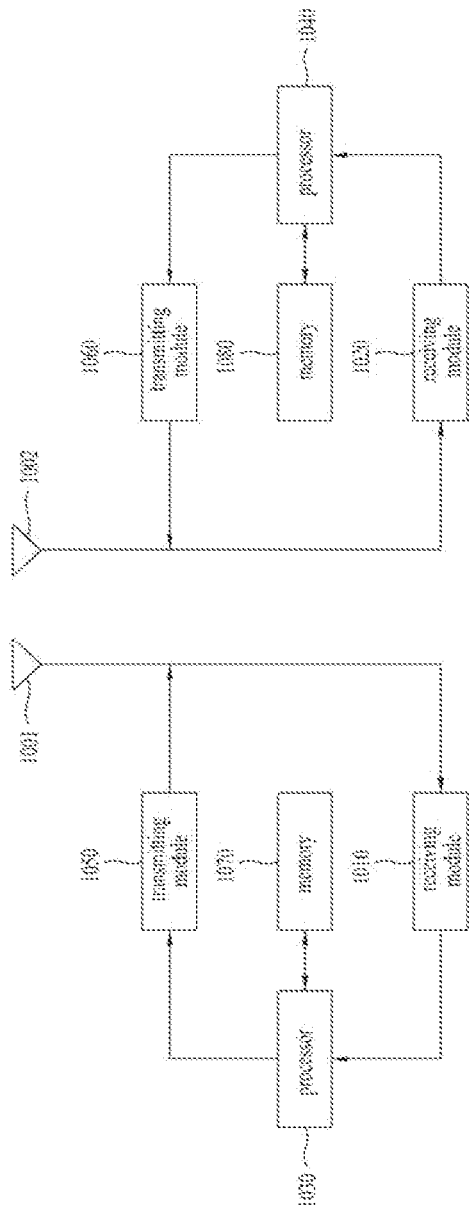
FIG. 10 is a block diagram for explaining a base station and a user equipment to implement embodiments of the present invention.

FIG. 10 is a block diagram for explaining a base station and a user equipment to implement embodiments of the present invention.

First of all, a user equipment may work as a transmitter in uplink and may work as a receiver in downlink. A base station may works as a receiver in uplink and may work as a transmitter in downlink. In particular, each of the user equipment and the base station may include a transmitter and a receiver for transmission of information and/or data.

Each of the transmitter and the receiver may include a processor, a module, a part and/or a means for performing embodiments of the present invention. In particular, each of the transmitter and the receiver may include a module (means) for encrypting a message, a module for interpreting an encrypted message, an antenna for transceiving messages and the like.

Referring to FIG. 10, a left part shows a structure of a transmitter and indicates a base station belonging to DAS. A right part shows a structure of a receiver and indicates a user equipment having entered a cell serviced by a DAS base station. The transmitter/receiver may include an antenna 1001/1002, a receiving module 1010/1020, a processor 1030/1040, a transmitting module 1050/1060 and a memory 1070/1080.

The antenna 1001/1002 may include a receiving antenna performing a function of externally receiving a radio signal and delivering it to the receiving module 1010/1020 and a transmitting antenna externally transmitting a signal generated from the transmitting module 1050/1060. In case that a multiple-antenna (MIMO) function is supported, at least two antennas can be provided.

The receiving module 1010/1020 may reconstruct a radio signal received externally via the antenna into original data in a manner of performing decoding and demodulation on the received radio signal and may be then able to deliver the reconstructed original data to the processor 1030/1040. Optionally, the receiving module and the antenna may be represented as a receiving unit for receiving a radio signal instead of being separated as shown in FIG. 10.

The processor 1030/1040 may generally control overall operations of the transmitter or the receiver. In particular, the processor may be able to perform a controller function for performing the above-described embodiments of the present invention, a MAC (medium access control) frame variable control function according to service characteristics and propagation environment, a handover function, an authentication function, an encryption function and the like.

The transmitting module 1050/1060 may perform prescribed coding and modulation on data, which is scheduled by the processor 1030/1040 and will be then transmitted externally, and may be then able to deliver the coded and modulated data to the antenna. Optionally, the transmitting module and the antenna may be represented as a transmitting unit for transmitting a radio signal instead of being separated as shown in FIG. 10.

The memory 1070/1080 may store programs for processing and control of the processor 1030/1040 and may be able to perform a function of temporarily storing input/output data (e.g., in case of a mobile station, UL grant assigned by the base station, system information, station identifier (STID), a flow identifier (FID), an action time, etc.).

And, the memory 1070/1080 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The processor 1030 of the transmitter may perform overall control operations on the base station. The processor 1030 of the transmitter may generate information on RS usable by each user equipment for channel estimation and indication information on a transmission reporting scheme according to the embodiments of the present invention described with reference to FIG. 8 and FIG. 9 and may control the generated informations to be transmitted to the receiver. The processor 1030 of the transmitter may configure various kinds of indication informations, which are determined and signaled to each user equipment by the base station described with reference to FIG. 8 and FIG. 9, and may derive necessary channel information by processing such control information transmitted by the receiver as CRS channel information and CSI-RS channel information.

The processor 1040 of the receiver may perform overall control operations of the user equipment and may be able to generate feedback information on a channel state by measuring RS transmitted by the transmitter via the receiving module 1020. In particular, the processor 1040 of the receiver may perform channel estimations on CRS and CSI-RS according to the embodiments of the present invention described with reference to FIG. 8 and FIG. 9 and may be then able to transmit both channel informations to the transmitter by a separate reporting scheme or a joint reporting scheme.

Meanwhile, the base station may include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

INDUSTRIAL APPLICABILITY

Embodiments of the present invention may be applicable to various kinds of wireless access systems. For examples of the various kinds of wireless access systems, there are 3GPP ($3^{rd}$ generation partnership project), 3GPP2 and/or IEEE 802.xx (institute of electrical and electronic engineers 802) system and the like. Embodiments of the present invention may be applicable to all technical fields of applying the various kinds of the wireless access systems as well as the various kinds of the wireless access systems.

What is claimed is:

1. A method of transmitting a channel information, which is transmitted by a user equipment (UE) in a wireless communication system, the method comprising:
    receiving, by the UE, a 1st reference signal transmitted in accordance with a 1st transmission period from a base station;
    receiving, by the UE, a 2nd reference signal transmitted in accordance with a 2nd transmission period from the base station; and
    performing, by the UE, channel estimation to obtain channel information using at least one of the 1st reference signal and the 2nd reference signal,
    wherein, if timing points of reporting both of a 1st channel information on the 1st reference signal and a 2nd channel information on the 2nd reference signal are overlapped and only one uplink channel is configured with the UE for reporting the channel information, the 1st channel information and the 2nd channel information are multiplexed together or one of the 1st channel information and the 2nd channel information is dropped.

2. The method of claim 1, wherein the 1st reference signal includes a cell-common reference signal (CRS) and wherein the 2nd reference signal includes a channel state information reference signal (CSI-RS).

3. The method of claim 1, wherein a reference for dropping the channel information includes at least one selected from the group consisting of a channel information size, a reporting bit width, a number of bits allocated to a channel information reporting and a power level.

4. The method of claim 1, wherein the 1st channel information and the 2nd channel information are sequentially transmitted in accordance with a prescribed transmission priority reference and wherein the prescribed transmission priority includes at least one selected from the group consisting of a channel information size, a reporting bit width, a number of bits allocated to a channel information reporting and a power level.

5. The method of claim 1, wherein, if timing points of reporting both of the 1st channel information and the 2nd channel information are overlapped, the 1st channel information and the 2nd channel information are multiplexed together, and a timing point of reporting the 1st channel information is adjusted into a prescribed offset range with reference to a timing point of reporting the 2nd channel information.

6. The method of claim 5, further comprising:
    receiving an indication information on a timing point of reporting the channel information from the base station.

7. The method of claim 1, further comprising:
    receiving an indicating information for designating a reference signal becoming a target of the channel estimation from the base station, wherein the indication information designates at least one of the 1st reference signal and the 2nd reference signal as the target of the channel estimation.

8. The method of claim 7, wherein the indication information further includes an indication information on a reporting scheme type of the control information, wherein the reporting scheme type includes a scheme of multiplexing the 1st channel information and the 2nd channel information together or a scheme of dropping one of the 1st channel information and the 2nd channel information.

9. The method of claim 1, wherein the 2nd transmission period is configured longer than the 1st transmission period.

10. A user equipment (UE) in a wireless communication system, comprising:
- a receiving module configured to receive a signal;
- a transmitting module configured to transmit a signal; and
- a processor configured to perform channel estimation to obtain channel information using at least one of a 1st reference signal and a 2nd reference signal received via the receiving module from a base station, wherein, if timing points of reporting both of the 1st channel information on the 1st reference signal and the 2nd channel information on the 2nd reference signal are overlapped and only one uplink channel is configured with the UE for reporting the channel information, the processor is configured to multiplex the 1st channel information and the 2nd channel information together or drop one of the 1st channel information and the 2nd channel information.

* * * * *